United States Patent [19]

Lampertz

[11] 4,371,283
[45] Feb. 1, 1983

[54] PROTECTION CHAMBER

[76] Inventor: Horst Lampertz, Schmalenbachstrasse 13, D-1000 Berlin 44, Fed. Rep. of Germany

[21] Appl. No.: 251,783

[22] Filed: Apr. 7, 1981

[30] Foreign Application Priority Data

May 6, 1980 [DE] Fed. Rep. of Germany ....... 3017286

[51] Int. Cl.³ .................. B25G 3/00; F16D 1/00; F16G 11/00
[52] U.S. Cl. .................... 403/288; 52/465; 52/469; 52/396; 312/137
[58] Field of Search ........... 403/288; 52/396, 403, 52/465, 466, 467, 469; 312/258, 263, 137, 140

[56] References Cited

U.S. PATENT DOCUMENTS

| | | | |
|---|---|---|---|
| 2,419,218 | 4/1947 | Jannsen | 52/469 X |
| 2,961,478 | 11/1960 | Burns | 52/469 X |
| 3,093,934 | 6/1963 | Underhill | 52/469 X |
| 3,124,047 | 3/1964 | Graham | 52/396 X |
| 3,300,913 | 1/1967 | Patry et al. | 52/469 X |
| 3,619,986 | 12/1971 | Klittich | 52/396 |
| 4,059,933 | 11/1977 | Funk et al. | 52/467 X |
| 4,067,155 | 1/1978 | Ruff et al. | 52/466 X |

*Primary Examiner*—Wayne L. Shedd
*Attorney, Agent, or Firm*—Young & Thompson

[57] ABSTRACT

A protection chamber for temperature-sensitive or moisture-sensitive materials, comprises heat insulated wall elements which are joined in a butt joint. A semi-elastic sealing compound is disposed in the joint; and an additional sealing compound of a material of greater elasticity is disposed at but outside the joint. A cover profile overlies the additional sealing material and the adjacent edges of the wall elements and is arcuate in the zone of the additional sealing compound but has relatively straight wings that are secured to the wall elements on opposite sides of the additional sealing compound.

5 Claims, 2 Drawing Figures

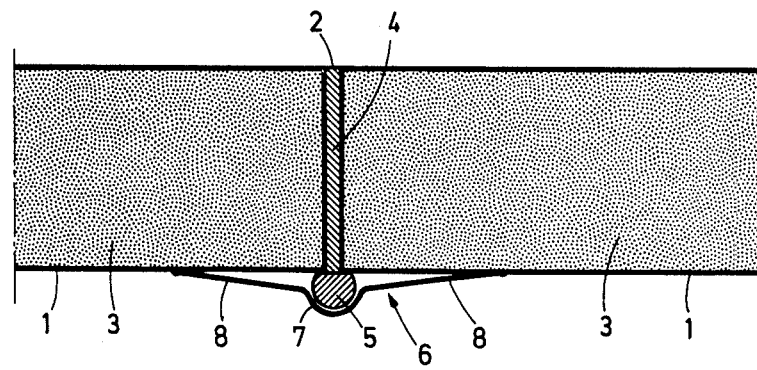
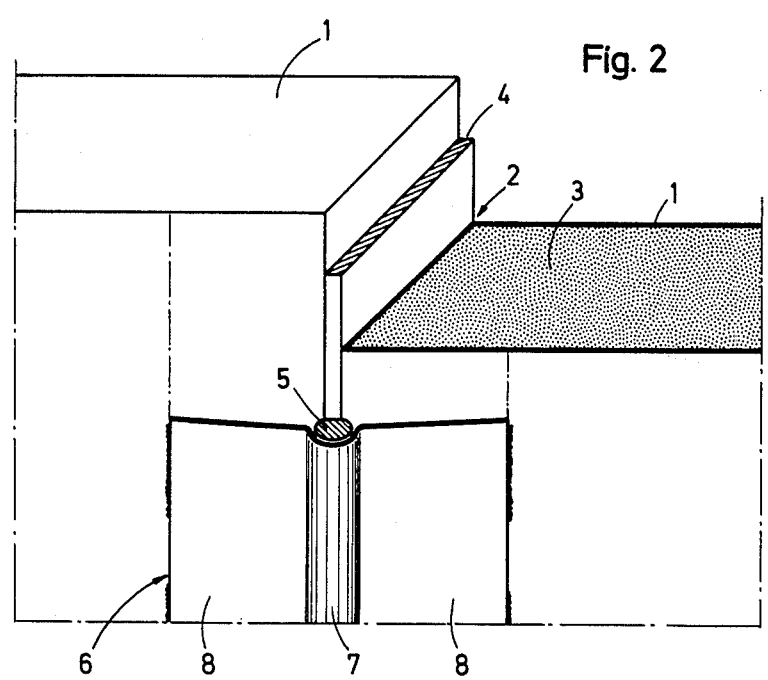

PROTECTION CHAMBER

The invention relates to protection chambers or cabinets, made up of individual elements which are joined together in a single-layer or multiple-layer arrangement in a detachable or nondetachable fashion, intended for temperature- and moisture-sensitive documents, especially data media, that is, data carriers or data storage media, wherein the abutting surfaces and/or edges of the individual elements are sealed in the joint gaps by a preferably ceramic-containing sealing compound.

Data protection cabinets are known, for example, from German Published Application No. 2,413,644 which, by the use of insulating materials or of a combination of several identical or different insulating materials, optimally protects the contents, particularly magnetic data media, from the effects of heat, gas, water, and moisture. These cabinets offer high mechanical protection, inter alia, due to welded edges and corners, to the contents in the form of paper documents or magnetic data media, even in the case where the cabinet is dropped or where flaming debris falls on the cabinet during a fire.

A further development and/or enlargement of such cabinets to an independent chamber is attained by the horizontal and vertical joining of individual elements in a single-wall or double-wall construction, wherein the joint gaps between two adjacent individual elements are sealed against the penetration of heat, gas, water, or moisture vapor by means of a semielastic composition, such as, for example, ceramic sealing agents.

Elements for erecting such a chamber are described, for example, in German OS No. 2,630,479. Such a safety chamber fulfills all the prerequisites for a data protection chamber or cabinet with respect to external effects of heat and moisture. However, since the mechanical burden can be considerable as well, for example on account of flaming debris, falling objects and parts of buildings in case of a fire, particularly as the detachably or nondetachably joined element edges are greatly impaired thereby, it is possible for the integrity of the sealing compound in the joint gaps to be lost, because the individual elements at that location can be deformed or mutually shifted.

The invention has the object of providing a protection chamber or cabinet made up of individual elements which ensure the tight seal of the joint gaps even in case of deformations in the zone of the joint gaps between neighboring individual elements.

The special advantage of the construction of the joints between two adjacent individual elements according to this invention resides in that, upon a mechanical effect acting from the outside, which can result in a mutual shifting of the elements or in a separation of the abutting edges from one another, the cover profile surrounding the additional sealing compound is stretched so that the profile section having a semicircular shape in cross section is flattened and thereby urges the additional sealing compound into the possibly enlarged joint gap as a replacement for the sealing compound which was interrupted in its continuity in the joint gap.

Additional features of the invention will be seen from the following description of an embodiment illustrated in the drawing, wherein FIG. 1 shows a section through two adjacent individual elements in the zone of the joint gap, and FIG. 2 shows a side perspective view thereof, partially broken away.

Referring now to the drawing in greater detail, it will be seen that two individual elements 1 of the wall of a protection chamber or cabinet are joined together by way of a joint gap 2 in a detachable or nondetachable fashion. The individual elements 1, covered with sheet metal, are filled as customary with a conventional fireproof, heat-insulating material 3. The fastening means for joining the individual elements 1 are not illustrated in detail. A ceramic-containing, semielastic sealing compound 4, such as a ceramic-containing asbestos fiber mat sold by the French firm Savoi under the trademark "Pyronap", is disposed in the joint gap 2. An additional sealing compound 5 of a material of greater elasticity, e.g. silicone rubber, projects from the joint gap 2 and is surrounded by a metal cover profile 6, especially a section 7 thereof which is arcuate in cross section. Substantially planar sections 8 of the cover profile 6 on both sides of the arcuate section 7 are attached to the individual elements 1 in a detachable fashion or (as illustrated) by welding in a non-detachable fashion.

The additional sealing compound 5 and the expansible cover profile 6 are suitably attached to the inside of the wall, since mechanical pressure or impact from the outside will cause the joint gap 2 to gape primarily on the inside so that due to thus-produced voids or fissures in the sealing compound 4, the insulating and sealing action of the latter would be lost. This, however, is prevented by the cover profile 6 which stretches in such a case and urges the additional sealing compound 5 into the vacated space within the joint gap 2.

What is claimed is:

1. A protection chamber comprising a plurality of protective wall elements with a joint between them, a sealing compound in the joint, and an additional sealing compound at the joint but on the outside of the joint, and a cover strip covering the additional sealing compound.

2. A protection chamber as claimed in claim 1, in which the cover strip is arcuate in cross section in the region of the additional sealing compound and extends on opposite sides of that arcuate region and overlies and is secured to the wall elements.

3. A protection chamber as claimed in claim 1, in which the sealing compound in the joint is a ceramic containing asbestos fiber mats.

4. A protection chamber as claimed in claim 3, in which the additional sealing compound is silicone rubber.

5. A protection chamber as claimed in claim 1, in which said additional sealing compound is silicone rubber.

* * * * *